H. G. SEDGWICK.
Improvement in Fire-Escapes.

No. 126,581.  Patented May 7, 1872.

3 Sheets--Sheet 3.

H. G. SEDGWICK.
Improvement in Fire-Escapes.

No. 126,581.            Patented May 7, 1872.

Witnesses:
Jas. O. Hutchinson
C. L. Evert

Inventor.
Hiram G. Sedgwick
per Alexander Mash
Attorneys.

UNITED STATES PATENT OFFICE.

HIRAM G. SEDGWICK, OF WARSAW, MISSOURI.

IMPROVEMENT IN FIRE-ESCAPES.

Specification forming part of Letters Patent No. 126,581, dated May 7, 1872.

*To all whom it may concern:*

Be it known that I, HIRAM G. SEDGWICK, of Warsaw, in the county of Benton and in the State of Missouri, have invented certain new and useful Improvements in Fire-Escape; and do hereby declare that the following is a full, clear, and exact description thereof, reference being had to the accompanying drawing and to the letters of reference marked thereon making a part of this specification.

The nature of my invention consists in the construction and arrangement of a "Fire-Escape and Ladder," as will be hereinafter more fully set forth.

In order to enable others skilled in the art to which my invention appertains to make and use the same, I will now proceed to describe its construction and operation, referring to the annexed drawing, in which—

Figure 1:
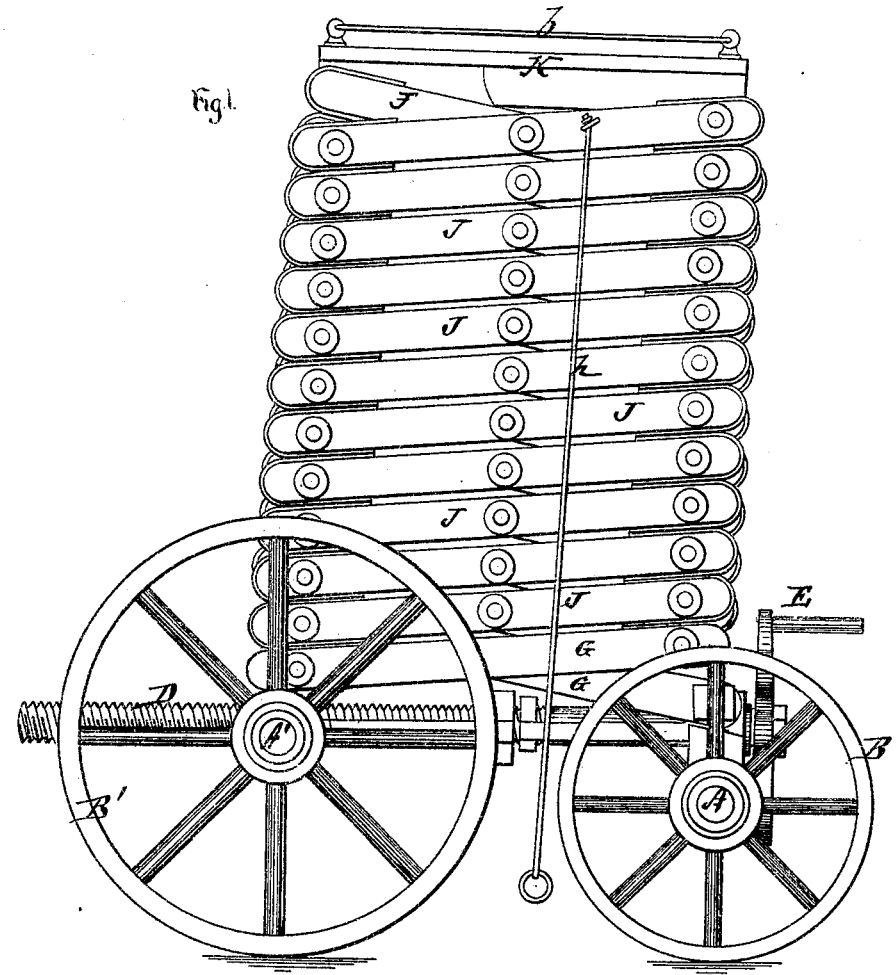
Figure 2:
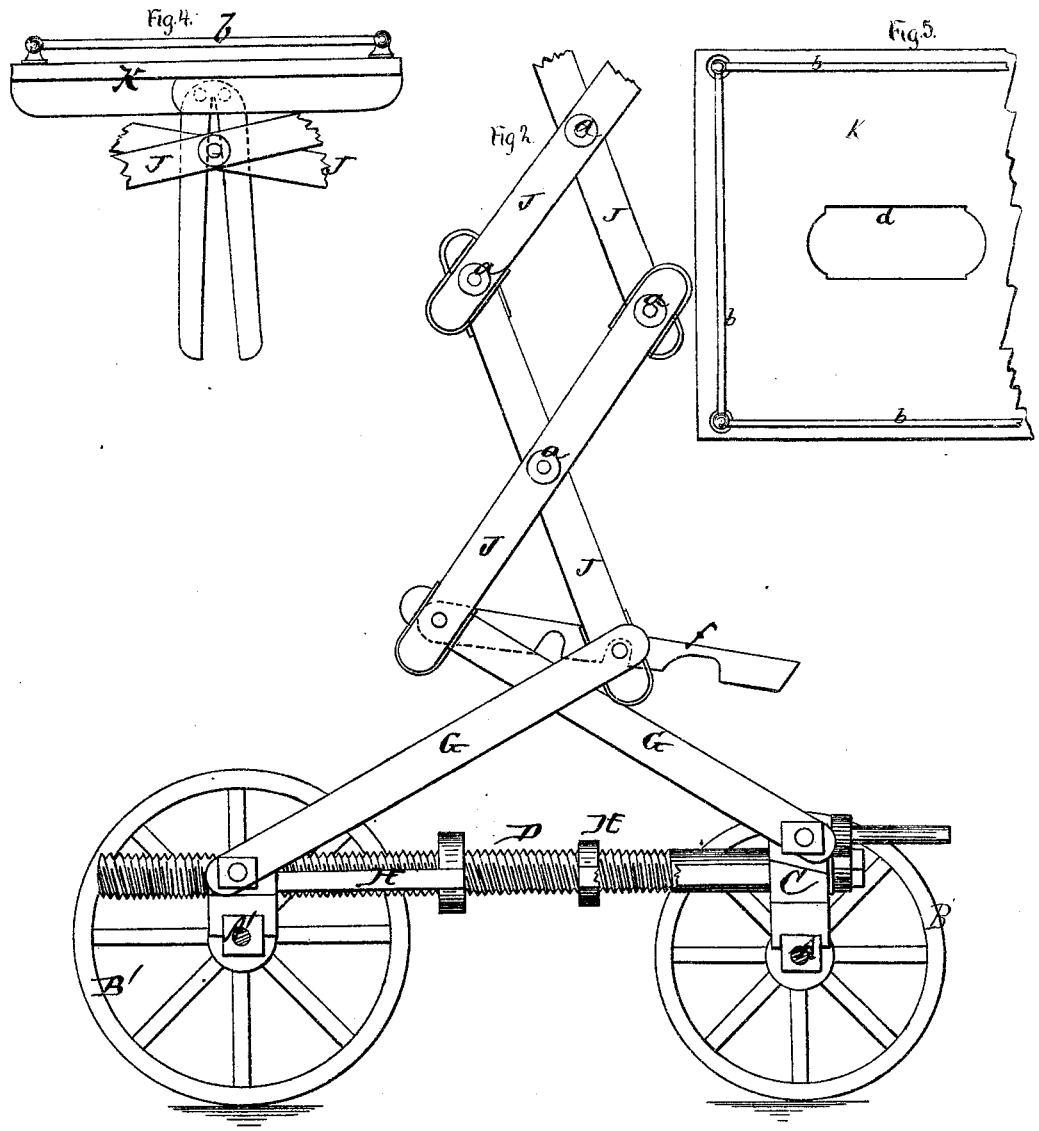
Figure 3:
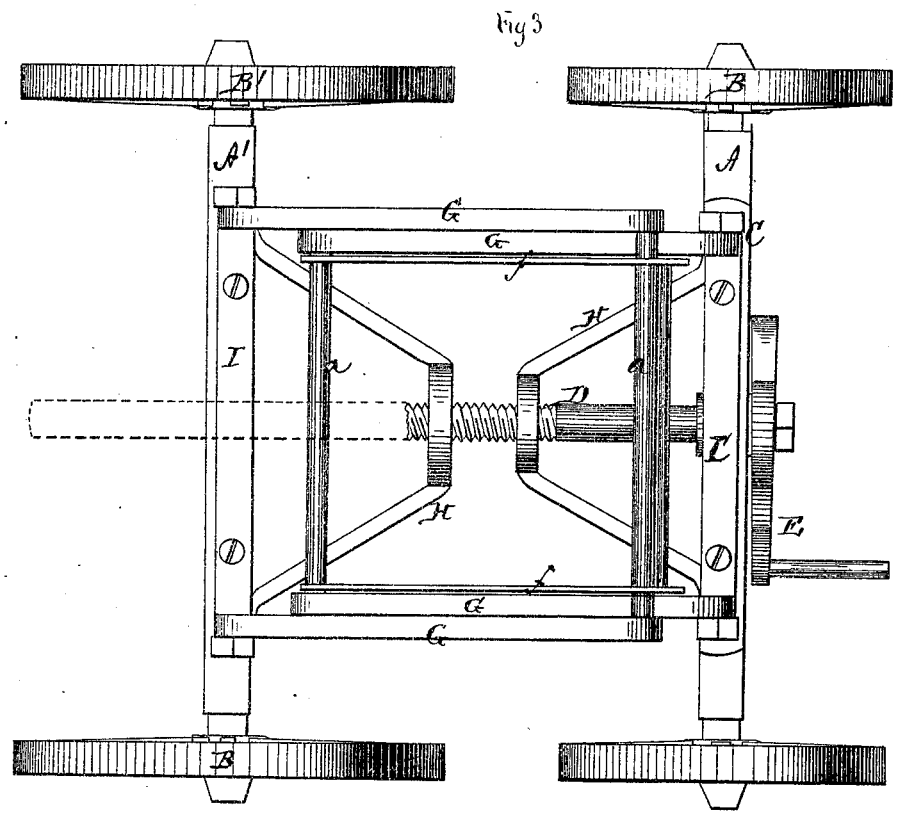

Figure 1 is a side elevation of my fire-escape, showing the same folded or closed in condition to be moved from place to place. Fig. 2 is a similar view of the lower portion of the same when extended for use and tilted to one side. Fig. 3 is a plan view of the truck or wagon, with the ladder removed, showing the entire operating mechanism. Fig. 4 is a side view, and Fig. 5, a plan view of the top platform.

The truck upon which my entire fire-escape and ladder rests is simply constructed of a front axle, A, with wheels B B and rear axle A' with wheels B' B'. Upon the front axle A is pivoted the bolster C, and through the center thereof passes a screw, D, provided with a crank, E, said screw also passing through the center of the rear axle, A'. By turning the screw D the axles are brought closer together or further apart, or, in other words, the truck contracted or extended; and by this motion the fire-escape and ladder are operated, both raised and lowered, and tilted to either side. Braces H H are secured to the bolster C and to the rear axle A', as shown in Fig. 3, to strengthen the truck, the screw D passing through the centers of said braces. On top of the bolster C, as well as on top of the axle A', is secured a bar, 1, to the ends of which are pivoted bars G G, made of iron and supporting the entire ladder. The bars G G on each side of the truck cross each other, as shown in Fig. 1, and to their outer ends are pivoted bars J J, which also cross each other, and are pivoted together in the center. Other bars J J are pivoted to the ends of the first, and so on as many as may be desired, forming a truss-work, which folds close together, as shown in Fig. 1, or be extended till the bars J J stand as near perpendicular as their position will admit. These bars J J may be made of iron or wood, and, if made of wood their ends should be iron-bound to give them the required strength. The various bars are pivoted together by means of rods $a$ $a$, which pass horizontally across and pivot the corresponding bars on the opposite side of the ladder, forming the rounds when the ladder is extended. On top of the ladder is a platform, K, provided with a railing, $b$, around its edges, and having an opening, $d$, in the center, which forms a passage-way to pass down the ladder. By turning the screw D so as to extend the truck the ladder is rapidly extended to any desired height perpendicularly upward. In a full-sized machine I calculate that four feet of screw will extend ladder ninety feet, but its capacity is only limited by the strength of the supporting truck. The bottom bars G G act as inclined planes upon which the rest rise up and slide down when lowered. When the ladder is extended as far as desired two notched arms $f f$, which are pivoted on the lowest rod $a$, at one end or on one side of the ladder, are let down so as to catch on the lowest rod $a$ on the opposite side. By now turning the screw D so as to contract the truck the ladder is tipped over to either side, the direction of the incline being given by means of ropes $h$ $h$ attached to the top of the ladder. The ladder is then raised to an upright position by extending the truck, and then lowered by contracting it again.

Having thus fully described my invention, what I claim as new, and desire to secure by Letters Patent, is—

1. A fire-escape and ladder operated by extending and contracting the truck upon which it is supported, substantially as herein set forth.

2. The combination of the truck A B A' B', bolster C, braces H H, screw D, and crank E, substantially as and for the purposes herein set forth.

3. The combination of the truck A B A' B', bolster C, braces H H, screw D, notched bar $f$, and crank E, all constructed and operating substantially as and for the purposes set forth.

In testimony that I claim the foregoing I have hereunto set my hand this 22d day of March, 1872.

HIRAM G. SEDGWICK.

Witnesses:
 A. N. MARR,
 C. L. EVERT.